United States Patent [19]

Goldsmith et al.

[11] Patent Number: 4,605,248
[45] Date of Patent: Aug. 12, 1986

[54] INSULATING UNION AND METHOD

[75] Inventors: John W. Goldsmith, Humble; Paul B. Rullman, Borger, both of Tex.

[73] Assignee: J. M. Huber Corporation, Locust, N.J.

[21] Appl. No.: 689,412

[22] Filed: Jan. 7, 1985

[51] Int. Cl.⁴ ............................................. F16L 19/02
[52] U.S. Cl. ..................................... 285/52; 285/347; 285/354
[58] Field of Search .................... 285/52, 55, 347, 354

[56] References Cited

U.S. PATENT DOCUMENTS 2,867,463  1/1959  Snider ................................. 285/52 X
3,115,354  12/1963  Bowan et al. ......................... 285/52

FOREIGN PATENT DOCUMENTS 557626  5/1958  Canada ................................. 285/52

Primary Examiner—Richard J. Scanlan, Jr.
Attorney, Agent, or Firm—Alec H. Horn; Robert L. Price; Loren Helmreich

[57] ABSTRACT

An improved insulating union is provided of the type designed to prevent electrolytic corrosion in flow lines. The tail sub is physically separated from both the threaded sub and nut by a plastic layer. An annular groove is conventionally provided in the threaded sub for an O-ring to seal between the plastic layer and the threaded sub. Another O-ring groove is provided in a tail sub for sealing between the tail sub and the plastic layer to prevent leakage of high pressure gas from the union. The O-ring is inserted in the tail sub groove, and the plastic insulating layer is thereafter molded over the end of the tail sub.

10 Claims, 3 Drawing Figures

INSULATING UNION AND METHOD

FIELD OF THE INVENTION

The present invention relates to a pipe union and, in particular, to a pipe union including an electrical insulating layer separating the threaded sub from the tail sub for preventing electrolytic corrosion in the flow lines interconnected by the pipe union.

BACKGROUND OF THE INVENTION

Pipe unions have long been employed to couple together axially aligned sections of pipe, conduit, or similar tubular flow lines. Buried lengths of such pipe commonly experience electrolytic corrosion, which substantially decreases the life of the flow lines. In order to reduce or eliminate such corrosion, insulated pipe unions have been employed, which electrically isolate the coupled union sections and therefore the lengths of pipe in order to prevent current flow through the system. Such insulated unions typically employ a plastic laminate bonded to the tail sub, so that the threaded sub and nut engage the electrically insulated plastic layer rather than the metal tail sub.

Both insulated and non-insulated unions typically employ a groove in the threaded sub for an O-ring. When the union is made up, the O-ring provides the seal between the threaded sub and tail sub (in the case of an insulated union, this seal is more precisely between the threaded sub and the plastic laminate) to prevent loss of fluid from the union.

Although the above described insulating unions have been employed in many applications, such unions experience a problem when used in gas flow lines operating under relatively high pressures, i.e., in excess of 1000 psi. As previously indicated, the plastic layer is ideally bonded to the end of the tail sub during the molding operation. In many instances, however, a gas-tight bond is not maintained over a long period of time, and leaks develop between the tail sub and the plastic layer in high pressure gas insulations. A gas leak in such an insulating union can be very expensive to repair, often requiring a complete shutdown of the system. Also, it is irrelevant from a practical standpoint that 99% of the unions may not leak at any point in time, since a system with one leak will still have to be repaired, and since after repair, another leak may develop. Moreover, the repeated making up and breaking apart of unions during service operations frequently causes prior art unions to leak even at relatively low pressure, e.g., 200 psi. Finally, gas leakage from any portion of a pressurized system may be extremely dangerous, as unfortunately evidenced by nationwide explosion reports. Accordingly, extremely high quality and repeatedly effective insulating unions are desired.

In an attempt to reduce leakage of gas from an insulating union, several attempts have been made to utilize special bonding agents and/or adhesives, either before or after molding the laminate over the tail sub. Although these solutions may decrease the likelihood of a leak, such attempts have not been 100% effective, and some unions still leak. Moreover, these attempts are labor intensive, and significantly increase the cost of manufacturing the insulating union.

The disadvantages of the prior art are overcome by the present invention, and an improved insulating union and method of manufacturing an improved insulating union are hereinafter disclosed.

SUMMARY OF THE INVENTION

An improved insulating union is provided of the type employing a plastic layer to electrically isolate and therefore prevent current flow between the threaded sub and the tail sub. A groove is cut in the end of the tail sub for an O-ring, and the plastic layer or laminate is molded over the end of the tail sub and over the tail sub O-ring. The O-ring seals between the tail sub and the plastic layer, and therefore prevents leakage commonly experienced in prior art insulating unions.

Accordingly, it is a feature of the present invention to provide an improved insulated union including an O-ring seal between the tail sub and the plastic laminate. The insulating union of the present invention may be easily manufactured with the laminate molded over the tail sub and O-ring, so that the cost of manufacturing insulating unions has not significantly increased. The union is highly effective at eliminating gas leaks in pressurized systems, even those operating under relatively high pressure, and can be easily utilized by pipeline installation personnel without modifying conventional installation techniques.

These and other features and advantages of the present invention will become apparent from the foregoing description, wherein reference is made to the Figures in the accompanying drawings.

DETAILED DESCRIPTION OF THE PREFERRED EMBODIMENT

Figure 1:
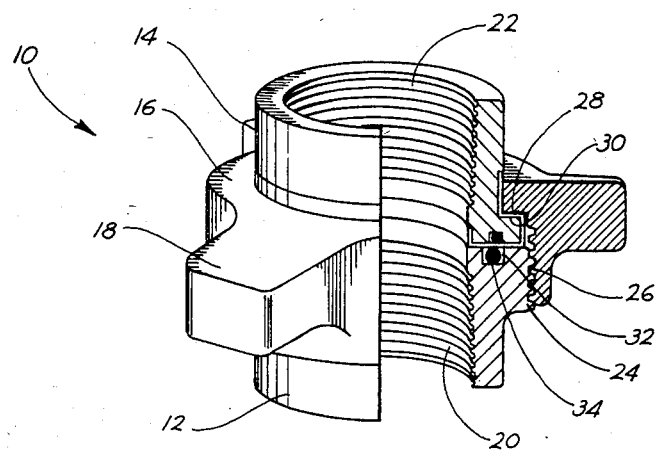
FIG. 1 is a pictorial view of an insulating union according to the present invention, with a portion of the union cut away for clarity of the union sealing means and plastic layer.

FIG. 1 depicts an insulating union 10 according to the present invention for preventing electrolytic corrosion in a pipeline. The primary components of the union 10 include a threaded sub 12, a tail sub 14, and a nut 16 having a plurality of projecting lugs 18 for facilitating rotation of the nut and coupling together of the subs. Each sub is typically provided with internal threads 20 and 22, so that the subs may be connected with respective portions or lengths of the pipeline. The threaded sub includes external threads 24 adapted for threaded engagement with the internal threads 26 of nut 16. Annular neck surface 28 of the nut is adapted for engagement with the corresponding shoulder surface 30 of the tail sub, so that rotation of the nut brings the tail sub into engagement with the threaded sub. Annular groove 32 is provided in the end of the threaded sub, and an O-ring 34 within the groove provides sealing engagement between the threaded sub and the tail sub when coupled together to prevent leakage from the union. The components described above are standard for prior art insulating and non-insulating unions, and thus need not be further detailed.

Figure 2:
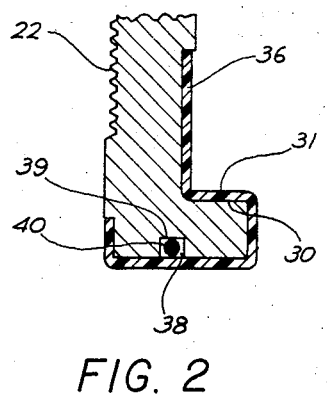
FIG. 2 is an enlarged cross-sectional view of the tail sub depicted in FIG. 1.

A commonly used technique for providing an insulating pipe union involves molding a plastic layer 36 over the end of the tail sub. Although the plastic layer is shown in FIG. 1, it is more particularly illustrated in FIG. 2. Layer 36 may be formed from any number of dielectric plastics, such as Nylon ®, or from other electrically insulating materials. It should be understood from FIGS. 1 and 2 that the plastic layer 36 is molded over the entire perimeter of the end of the tail sub, so that no portion of the metal threaded sub is in engagement with the metal tail sub when the union is assembled. Also, the plastic layer continues along the outer side of the tail sub as shown in FIG. 2, so that no portion of the metallic nut 16 engages the metal tail sub. The tail sub is thus electrically isolated from both the threaded sub and nut to prevent electrolytic corrosion in the pipeline. In an insulating union, the shoulder 31 of the plastic layer engages the neck surface of the nut, forcing the tail sub into engagement with the threaded sub. As previously indicated, a significant problem with prior art insulating unions of this type is that high pressure gas in the pipeline occasionally leaked between the tail sub and the plastic layer 36, even though the nut 16 had been adequately torqued to the extent generally required to bring the ends of the subs into sealing engagement.

The above problem is overcome with the present invention by providing an annular groove 38 in the end of the tail sub, and placing an O-ring 40 in the groove 38 before molding the plastic layer over the end of the tail sub. The entire annular length of the O-ring 40 is thus in sealing engagement with the plastic layer 36, and prevents gas leakage from the union under test pressures in excess of 4000 psi. Such a union conventionally is rated substantially below its maximum test pressure, so that the union may be rated at 2000 psi.

Referring again to FIG. 1, the preferred embodiment of the present invention places the annular groove 38 and O-ring 40 radially aligned with the annular groove 32 and O-ring 34 in the threaded sub. In other words, it is preferably that the mean diameter of the circular groove 38 be greater than the inner sidewall diameter of the circular groove 32 and less than the outer sidewall diameter of the groove 32, and each groove is axially aligned with the union. The groove 38 is thus directly opposite the groove 32 along its entire length. It is believed that the resiliency of the O-ring 34 acting against the plastic layer 36 may contribute to the successful sealing engagement of the O-ring 40 with both the layer 36 and the tail sub. Also, this design may also increase the effectiveness of the O-ring 34 seal with the plastic layer 36 and the threaded sub.

Cylindrical sidewalls of the groove 38 may be aligned with the axis of the tail sub, and preferably the base 39 of the groove 38 is substantially perpendicular to the axis of the tail sub in order to provide a reliable seal with the O-ring 40. It has also been found that the cross-sectional diameter of the O-ring 40 in the tail sub may be substantially less than the cross-sectional diameter of the O-ring 34 in the threaded sub, and preferably O-ring 40 as a mean cross-sectional diameter of approximately between 25% to 50% of the mean cross-sectional diameter of O-ring 34.

FIG. 1 illustrates a union for a nominal 2" diameter pipeline, although the concept of the present invention may be utilized on any diameter pipe. For a 2" union, the thickness of the plastic layer 36 typically varies from about approximately 0.025" to about approximately 0.065". O-ring 34 has a cross-sectional diameter of approximately 0.250", and groove 34 has a width slightly greater than 0.250". The O-ring 40 may have a cross-sectional diameter of from between 0.006" to 0.125", and the groove 38 similarly has a width slightly greater than the cross-sectional diameter of O-ring 40.

Figure 3:
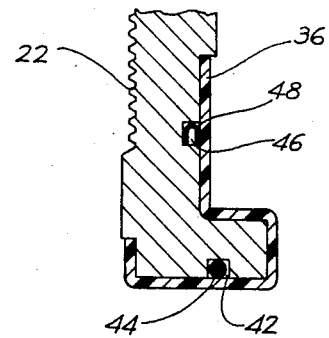
FIG. 3 is an enlarged cross-sectional view of another embodiment of the apparatus depicted in FIG. 2.

FIG. 3 depicts an alternate embodiment of the tail sub shown in FIG. 2, with groove 42 and O-ring 44 provided in the end of the tail sub, but not at a location radially aligned with the groove and O-ring in the threaded sub. Tests indicate that the groove 42 and O-ring 44 are not as effective at providing a seal as the groove 38 and O-ring 40 shown in FIG. 2. When these grooves are not radially aligned, there is a greater tendency for gas under high pressure in a pipeline to escape between the plastic layer 36 and the tail sub.

FIG. 3 also depicts a side groove 46 and a lip seal 48. Tests also indicate that a groove and O-ring in the side of the tail sub also is not as effective a seal as the embodiment shown in FIGS. 1 and 2. Lip seal 48 is more expensive than an O-ring seal, and should not be necessary to establish the desired sealing engagement between the tail sub and the plastic layer. It should be understood, however, that the annular sealing means between the tail sub and the plastic layer is not necessarily limited to an O-ring, and other sealing means such as a lip seal may be used instead of the illustrated O-ring seals. Although a groove is preferably provided for the sealing means between the plastic layer and the tail sub, it should also be understood that the groove need not have a rectangular cross-sectional configuration.

It is also within the concept of the present invention to provide plastic layer over an end of the threaded sub. In this assembly, an annular groove and O-ring may be provided in the tail sub for sealing between the plastic layer and the tail sub when the union is assembled, and a smaller cross-sectional diameter O-ring and annular groove may be provided in the end of the threaded sub for sealing between the threaded sub and the plastic layer. In essence, the plastic layer and sealing means have been reversed to the opposite subs from the embodiment shown in FIG. 2. This other embodiment is not generally preferred, however, since the insulating layer 36 would have to be formed over the threads 54 of the threaded sub to electrically isolate the nut 16 from the threaded sub.

The plastic layer 30 may be conveniently applied over the end of the tail sub according to the present invention by means other than a molding operation. Objectives of the molding operation according to the prior art were both to affix the plastic layer to the tail sub and to provide the desired gas-tight bonded seal between the tail sub and the plastic layer. According to the present invention, this seal may be provided by the O-ring between the tail sub and the plastic layer. Accordingly, layer 36 may be applied over the end of the tail sub and O-ring 40 by various techniques which do not attempt to bond the plastic layer to the tail sub in a gas-tight manner, such as dipping.

The material selection of the plastic layer determines the pressure rating of the insulating union according to the present invention. As previously indicated, Nylon ® may be used to obtain a union rating pressure of 2000 psi. If a polymer material with a higher cold flow point is utilized, the rating of the union may be increased. Another suitable substitute polymer material is Ryton ™.

These and other features and advantages of the methods and apparatus of the present invention will be readily appreciated by those skilled in the art. Accordingly, the figures and description herein supplied should be understood as exemplary for the present invention and not as limitations thereto.

What is claimed is:

1. An insulating pipe union for preventing electrolytic corrosion in a pipeline, including a metallic tail sub for interconnection with a first length of pipeline, a metallic threaded sub for interconnection with a second length of pipeline, a nut for threaded engagement with said threaded sub and for joining together said tail sub and said threaded sub, an electrically insulating layer covering the end of said tail sub, a first annular groove in an end of said threaded sub, and a first O-ring in said threaded sub groove for sealing engagement with said insulating layer, the improvement comprising:

said electrically insulating layer being bonded to said tail sub for forming a first seal with said tail sub;

a second annular groove in said end of said tail sub; and a second O-ring in said tail sub groove for sealing engagement between said tail sub and said electrically insulating layer for forming a second seal with said tail sub.

2. An insulating union as defined in claim 1, wherein said second annular groove in said tail sub has a rectangular configuration and is radially aligned with said first annular groove in said threaded sub.

3. An insulating union as defined in claim 2, wherein a base surface of said second annular groove in said tail sub is substantially perpendicular to the axis of said tail sub.

4. An insulating union as defined in claim 1, wherein the cross-sectional diameter of said second O-ring in said tail sub is less than approximately one-half the cross-sectional diameter of said first O-ring in said threaded sub.

5. An insulating union as defined in claim 1, wherein said nut is metallic, and said insulating layer prevents said metallic nut from engaging said tail sub.

6. A method of forming an insulating pipe union of the type including a metallic tail sub, a metallic threaded sub, and a nut for threaded engagement with the threaded sub to join together the tail sub and the threaded sub, comprising:

forming an annular groove in an end of said tail sub;

placing an O-ring in said annular groove; and thereafter bonding an electrically insulating layer to said end of said tail sub for forming a first seal with said tail sub;

whereby said O-ring forms a second seal between said tail sub and said insulating layer to prevent leakage of gas from said union.

7. A method as defined in claim 6, wherein said electrically insulating layer is bonded to said tail sub by a molding operation.

8. A method as defined in claim 6, wherein said union includes an annular groove in an end of said threaded sub and an O-ring in said threaded sub groove for sealing engagement with said insulating layer, and wherein the method further comprises:

forming said annular groove in said tail sub so that said O-ring in said tail sub is radially aligned with said annular groove in said threaded sub.

9. A method as defined in claim 8, further comprising:

forming a base surface of said annular groove in said tail sub substantially perpendicular to the axis of said tail sub.

10. A method as defined in claim 6, further comprising:

selecting said O-ring in said tail sub having a cross-sectional diameter less than approximately one-half the cross-sectional diameter of said O-ring in said threaded sub.

* * * * *